Jan. 17, 1967        C. D. CICCHELLI        3,298,806

METHOD FOR MAKING ABRASIVE SEGMENTS FOR SAWS

Filed Dec. 27, 1961                                                2 Sheets-Sheet 1

Cosimo D. Cicchelli
Inventor
by Cedric W. Porter
Attorney

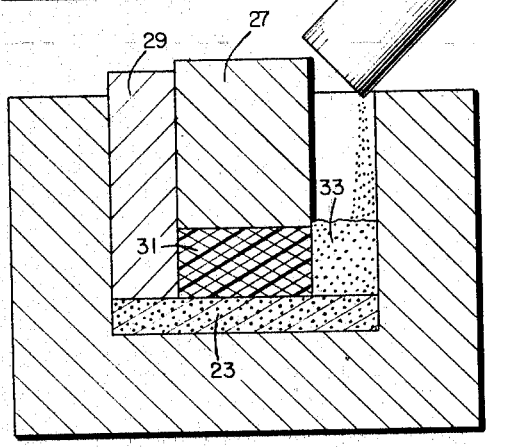
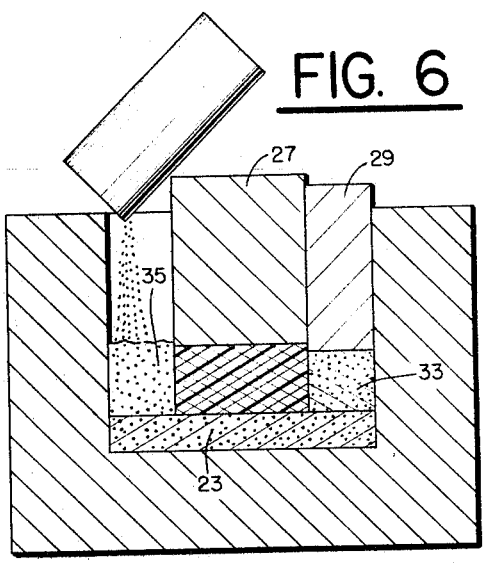
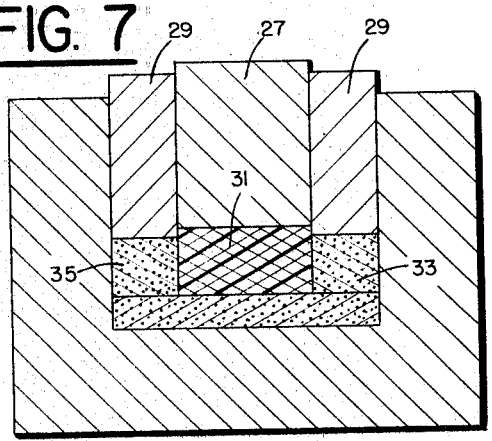
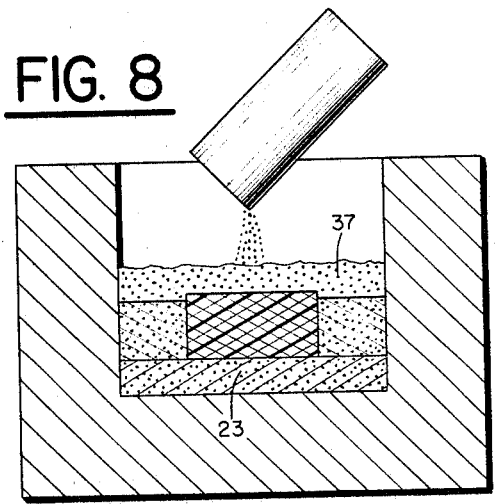
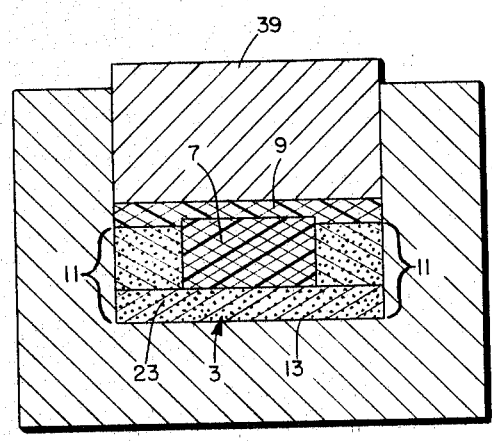
Cosimo D. Cicchelli
Inventor
by Cedric W. Peter
Attorney

3,298,806
METHOD FOR MAKING ABRASIVE SEGMENTS FOR SAWS
Cosimo D. Cicchelli, Torrance, Calif., assignor to Felker Manufacturing Company, Torrance, Calif., a corporation of California
Filed Dec. 27, 1961, Ser. No. 162,340
1 Claim. (Cl. 51—293)

This invention relates to improvements in the diamond-containing segments which are mounted on the rim of a strong circular sheet metal disk to form the cutting elements or teeth of a rotary saw or cutting wheel adapted to cut very hard metallic and mineral bodies. More especially, the invention relates to the type of such diamond wheels which is used for cutting contraction joints in concrete highways, airport runways and other initially monolithic concrete slabs or aprons.

In particular, the invention relates to such saws designed for the specific purpose of recutting and widening existing contraction joints which have been sealed with waterproof filling material in defective manner or with former types of sealer which it is desired to replace with more modern improved sealing compounds, equipment and methods.

It is found that the sealing compounds do not adhere properly to the surfaces of dirtied old joints, but do so satisfactorily to newly sawed and hence clean surfaces of the old concrete. Thus, resawing is required, especially of the two opposing surfaces of the joint, rather than merely removing the old sealer and refilling the joint with new sealer.

This preparatory cutting step of course involves a widening and sometimes straightening of the joint to a width after recutting of from ¼" up to 1", and heretofore to attain this wider cut the practice has been to use conventional cutting wheels of metallic oxide abrasive material bonded with resin, or to mount two thin diamond type blades or wheels on the driving mandrel with a spacer in between them. The common resin bonded abrasive wheel cuts very slowly in aged, "cured," concrete.

The twin-bladed diamond-containing form tends to "toe in," causing segment loss and uneven wear of the diamond-bearing rim, the individual blades of the pair vary in their useful life, and difficulties arise through improper distribution of the coolant to the blades. This form also involves inefficient and wasteful use of the diamonds because the latter are not concentrated on the sides and face of the rim where the work is being done. To make a blade of the required width of face (peripheral surface) in the known manner involving diamonds dispersed to uniform depth throughout each segment would make the cost of the wheel prohibitive.

Hence the aim of the present invention is to produce a diamond wheel which will serve for recutting contraction joints, and for other purposes as well, which will do the work better than the twin-bladed forms and yet can be made at a cost rendering its use commercially practicable, one that will be more nearly immune to blade damage, can not "toe in," will cut both sides of the joint equally, and will cut faster yet last longer than the conventional wheels using metallic oxide abrasive materials.

To these ends, the invention comprises novel diamond-containing elements or segments for mounting on the rim of a rotary saw or cutting wheel, in which the diamonds are confined solely to the portions of each segment which form the working face and the sides adjacent thereto, the interior of the segment containing no diamonds and being composed of plain metallic alloy serving as a filler. The invention also includes a selective molding method and procedure for confining the diamonds to these outer portions, and apparatus for practicing this method.

Other objects of the invention are as set forth hereinafter.

An illustrative embodiment of the invention is shown on a greatly enlarged scale in the drawings, in which:

FIGS. 2 to 9 show the mold and the components used in making the improved abrasive segment, and illustrate serially the successive steps followed in making the segment therewith.

Figure 1:
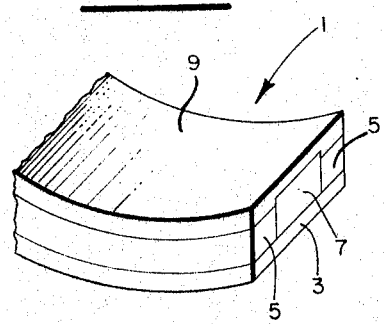
FIG. 1 shows a portion of one of the improved diamond-containing abrasive segments.
Figure 2:
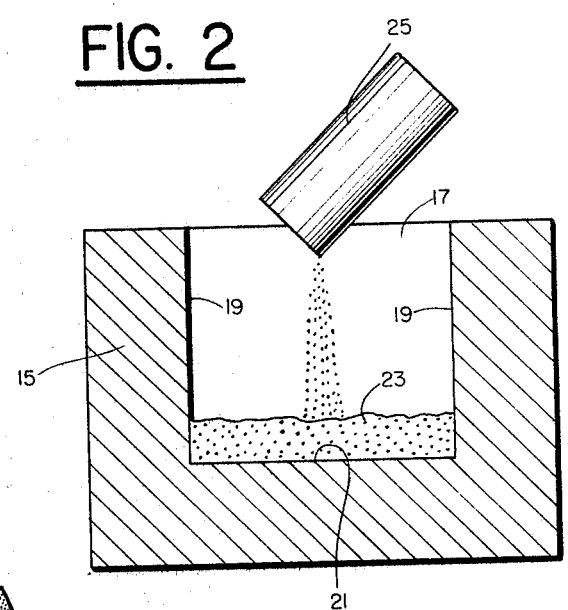

As shown in FIG. 1, the novel segment 1 is composed of five initially distinct portions. A relatively thin convex layer 3 with fragmented diamond bort distributed in the desired concentration throughout a suitable powdered metallic molding alloy forming a matrix extends throughout the width and length of the segment to form the convex working face thereof. The sides of the segment are parallel and are composed of segmental portions 5 of diamond-containing alloy of the same concentration of diamonds as the face portion 3 or as preferred, are coextensive with the portion 3 in length, and are of uniform width and thickness throughout and bonded to the face portion 3. A segmental filler or core 7 of steel or other alloy containing no diamonds and coextensive in length with the portions 3 and 5 fills the space between the side portions 5 and extends slightly above the top surfaces of portions 5, being bonded to portions 3 and 5 at all contiguous points, and being exposed at the ends of the segment.

Figure 10:
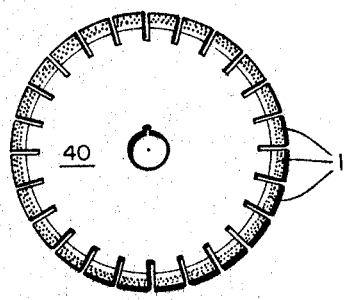
FIG. 10 shows a complete saw having the improved segments applied thereto.

A backing or mounting pad 9 of segmental form overlies and is bonded to the side portions 5 and filler 7, being coextensive with the surfaces of these parts contiguous therewith. This pad 9 is made of any suitable moldable alloy capable of being easily welded or brazed to the rim of the steel disk 40, FIG. 10, forming the body of the saw, and provides for grinding and cleaning operations in fitting the segment to the rim.

Thus in the illustrated example, the layer or coating of diamond-bearing alloy which covers the face and most of the sides of the segment is about three times as thick radially at the edges of the segment, and twice as thick transversely of the segment, as it is within the width of the core 7, FIG. 9. That is, the majority of the diamonds forming the abrasive coating are disposed along the parallel sides 11, and inward from each side for about ¼ of the way across the face 13, and the minor quantity of the diamonds are in the middle zone, the part overlain by the filler or core 7. Hence the diamond-bearing parts forming the sides and the lateral zones of the face, and which perform the heavy cutting of the concrete in widening the joint, are as noted approximately three times as thick in radial extent as such middle zone, which latter comes into use only occasionally, as when the joint is crooked and has to be cut away at the bottom as well as at its sides.

Contrived in this manner, diamond saws with cutting faces of ¼", ⅜", ½", and even up to 1" in width, can be made at a cost that is still economically feasible, since only about one-half of the volume of the cutting parts below the backing pad 9 contain the costly diamond bort.

The manner and means for making the improved segment are shown in successive steps in FIGS. 2 to 9, with specific reference to a concrete joint cutting wheel segment having a cutting face ½" wide and 2" long. The abrasive parts of the segment are made from a mix of fragmented diamond bort and metallic alloy molding powder, of the particular type suited for the end use of the blade in question. The diamond size and concentration are chosen for the particular end use intended. A typical concentration for the cutting would be 36 carats per cubic inch of 24–60 mesh sizes. The mix is conveniently made the same for all three cutting components 3, 5 and 6. For example, a mix for the entire segment will comprise 4.48 carats of diamonds thoroughly blended with 76.44 carats of steel powder known commercially as Plast-Iron, grade B281.

A mold 15 is provided having a rectangular cavity 17 that is ½" wide and 2" long and having vertical walls 19 and a curved bottom 21 that is a segment of a cylinder having a radius equalling the outside diameter of the finished cutting wheel. A charge of 40.62 carats of the mix is weighed out, placed in a vial 25, FIG. 2, and poured into empty mold cavity 17, and spread to uniform thickness into a layer 23, to form the face portion 3 of the segment. A preliminary plunger is put into place and the mix given a light squeeze to fix it in place. The plunger is then removed.

Figure 3:
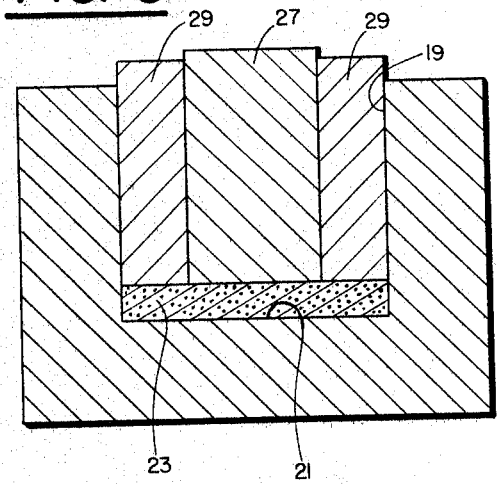
Figure 4:
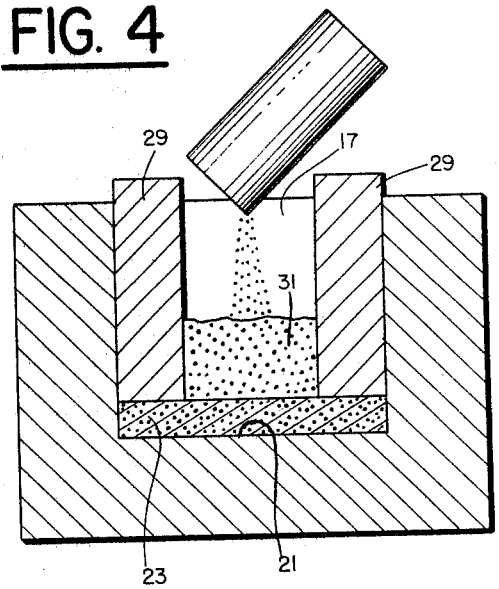

Next, three plungers or spacer blocks 27, 29, 29, FIG. 3, exactly fitting within the cavity 17, respectively ¼" and ⅛" thick, and 2" long, and with bottom surfaces curved to parallel the bottom of the mold, are inserted in the mold and rest upon the layer 23. Plunger 27 is then withdrawn, and a charge of 37.5 carats of plain diamond-free alloy 31, FIG. 4, of Plast-Iron B281 is poured onto the layer 23 and between the two lateral plungers 29, 29, and leveled by inserting plunger 27, or an undersized version of the same. This is to form the filler portion 7. Pressure of about 100 lbs. is then applied to plunger 27 or its counterpart, to compact the charge 31 and the underlying portion of charge 23 so that they will hold their shape and position when the lateral plungers 29, 29 are withdrawn.

With plunger 27 still in place, but merely resting on the charge 31, one of the lateral plungers 29 is removed, with caution not to disturb the charge 31, and a second charge 33, FIG. 5, of the mix of diamonds and alloy weighing 20.15 carats is poured into the space thus reserved in the mold and onto the exposed surface of layer 23, and this lateral plunger 29 is then replaced on top of such charge. This forms one of the side portions 5.

Likewise, the other plunger 29 is removed, and the final charge 35, FIG. 6 of 20.15 carats of diamonds and alloy is poured into the space left vacant beside the plunger 27 and onto layer 23, to form the other side portion 5. The lateral plunger 29 is then replaced, FIG. 7, and the whole is compacted by light pressure on the three plungers, to prevent flow of the powder, since all the plungers are next removed. Both plungers 29 may be removed at the same time, if preferred.

With the plungers removed, the powdered diamond-free alloy material 37, FIG. 8, which is to form the backing pad 9 is poured over the top surfaces of the batches 31, 33 and 35, spread over the entire width and length and leveled off. If preferred, this backing pad is made of a softer alloy than that used for the rest of the segment, and the charge will be of approximately 18.7 carats weight.

Thereafter, a plunger 39, FIG. 9, closely fitting the remainder of the mold cavity 17 is inserted, a pressure of 1000 p.s.i. is applied thereto, and the contents of the mold sintered at approximately 2000° F. to solidify the mold contents into a dense, strong, finished segment.

In this way the necessary number of segments 1 to go around the steel disk or core are made, and then their backing pads are ground to fit and brazed or welded around the periphery of the disk in usual manner.

It is to be noted that the volume of the plain alloy filler 31 is such as to remain slightly higher than the flanking charges 33 and 35. This prevents any diamonds in these charges from flowing onto the filler charge, where their utility would be lost.

The improved diamond wheel provided with the novel segments costs less than the twin-bladed type using narrow-faced blades mounted in spaced relation, and avoids the latter's drawbacks of toe-in, variation in individual blade life, proneness to blade damage, and deficient distribution of coolant. The more economical use of the diamonds, by restricting their placement to the locations where they stand a chance of performing their intended function before the wheel becomes unserviceable, makes practicable the construction of wheels of a width of face that would be excessively costly for the use described if made in conventional manner with diamonds in the same concentration distributed uniformly throughout the working part of the segment.

While I have illustrated and described a certain form in which the invention may be embodied, I am aware that many modifications may be made therein by any person skilled in the art, without departing from the scope of the invention as expressed in the claim. Therefore, I do not wish to be limited to the particular form shown, or to the details of construction thereof.

I claim:

The method of making a diamond-containing segment which comprises providing a mold having an elongated cavity of the desired size and shape of said segment, said mold including a concave bottom adapted to form the outer surface of the face of said segment, spreading a mixture of matrix-forming metallic powder material and diamond particles to a uniform thickness over the bottom of said mold to form the face of said segment, inserting in said mold a plunger having a width and length to fill said cavity, and provided with a concave bottom which is parallel to the bottom of said mold, said plunger comprising three elongated upstanding spacer blocks arranged side by side, compressing said layer of diamond particles and matrix-forming metallic powder material sufficiently to fix it in place, removing the middle said spacer block, inserting in the cavity left thereby a charge of the matrix-forming metallic powder material free of diamonds to form the core of said segment, compressing said charge of matrix-forming metallic powder material free of diamonds sufficiently to compact the particles thereof to make the compacted mass dimensionally stable, removing the remaining two spacer blocks, inserting in the space left by said two said spacer blocks a charge of a mixture of diamond particles and the matrix-forming metallic powder material to form the sides of said segment, compressing the last recited said charges sufficiently to fix the same in place, spreading a layer of the matrix-forming metallic powder material free of diamonds over the previously inserted charges to form the backing pad of said segment, inserting a plunger adapted to fill said cavity and having a concave bottom conforming to the desired shape of the outer surface of said backing pad in said cavity, subjecting the contents of said cavity to a pressure sufficient to consolidate the same into a unitary mass,
and heating the unitary mass to an elevated temperature sufficient to sinter the matrix-forming metallic powder material.

References Cited by the Examiner
UNITED STATES PATENTS

| | | | |
|---|---|---|---|
| 2,737,454 | 3/1956 | Danec | 51—309 |
| 2,766,565 | 10/1956 | Robinson et al. | 51—206 |
| 2,870,484 | 1/1959 | Livingston | 18—34 |
| 2,906,612 | 9/1959 | Anthony et al. | 51—309 |
| 2,910,810 | 11/1959 | Fuchs | 51—293 |
| 3,045,284 | 7/1962 | Peras | 18—34 |
| 3,049,843 | 8/1962 | Christensen | 51—209 |
| 3,069,816 | 12/1962 | Pratt et al. | 51—206 |
| 3,162,187 | 12/1964 | Christensen | 51—206 |
| 3,203,774 | 8/1965 | Pratt | 51—293 |

ALEXANDER H. BRODMERKEL, *Primary Examiner.*

MORRIS LIEBMAN, *Examiner.*

D. J. ARNOLD, *Assistant Examiner.*